United States Patent [19]

Lehr et al.

[11] 4,327,208

[45] Apr. 27, 1982

[54] CONTINUOUS PROCESS FOR THE HYDROLYTIC PRODUCTION OF POLYCAPROLACTAM HAVING A LOW-MONOMER AND LOW-DIMER CONTENT

[75] Inventors: Günter Lehr, Krefeld; Uwe Hücks, Alpen; Hugo Vernaleken, Krefeld; Werner Nielinger, Krefeld; Erhard Tresper, Krefeld, all of Fed. Rep. of Germany

[73] Assignee: Bayer Aktiengesellschaft, Leverkusen, Fed. Rep. of Germany

[21] Appl. No.: 167,055

[22] Filed: Jul. 9, 1980

Related U.S. Application Data

[63] Continuation of Ser. No. 38,510, May 14, 1979, abandoned.

[30] Foreign Application Priority Data

May 18, 1978 [DE] Fed. Rep. of Germany ....... 2821686

[51] Int. Cl.³ .............................................. C08G 69/16
[52] U.S. Cl. ....................................... 528/323; 526/68
[58] Field of Search .......................... 528/323; 526/68

[56] References Cited

U.S. PATENT DOCUMENTS 2,735,839  2/1956  Schrenk .............................. 528/323

*Primary Examiner*—Harold D. Anderson
*Attorney, Agent, or Firm*—Connolly and Hutz

[57] ABSTRACT

A process for the production of polyamide-6 or corresponding copolyamides by hydrolytic polymerization wherein the low molecular weight secondary reaction products and the unreacted $\epsilon$-caprolactam are separated off from the polyamide melt and directly condensed on the $\epsilon$-caprolactam melt to be polymerized.

7 Claims, No Drawings

CONTINUOUS PROCESS FOR THE HYDROLYTIC PRODUCTION OF POLYCAPROLACTAM HAVING A LOW-MONOMER AND LOW-DIMER CONTENT

This application is a continuation of application Ser. No. 38,510 filed May 14, 1979, now abandoned.

This invention relates to a process for the production of polyamide-6 and copolyamides consisting of at least 60%, by weight, of caprolactam units wherein low molecular weight reaction products and unreacted $\epsilon$-caprolactam are separated from the polycaprolactam melt by using reduced pressure and elevated temperatures.

The hydrolytic polymerisation of $\epsilon$-caprolactam continues to a temperature-related equilibrium at which the content of $\epsilon$-caprolactam and low molecular weight reaction products (oligomers) amounts to from 7 to 14% for the conventional working temperatures of from 240° to 180° C. and for the conventional additions of water. This content is also known as the "extract content" because both the $\epsilon$-caprolactam and the oligomers may be extracted with water.

Polyamide-6 has to be substantially freed from the low molecular weight reaction products and the unreacted $\epsilon$-caprolactam before further processing because these fractions adversely affect inter alia the mechanical properties of polyamide mouldings. Various processes are known for this purpose. For example, granulates may be produced from the equilibrium melt and may be freed from the $\epsilon$-caprolactam and the oligomers by extraction with water in extraction units. In this process, the granulates have to be dried subsequently and the effluents containing $\epsilon$-caprolactam and oligomers have to be worked-up. The cost of these process steps and the energy consumption thereof are considerable.

In other known processes, the extract content is reduced before the melt is spun off. Thus, the extract contents may be reduced, for example, by means of gases which are brought into contact with or produced in the melt, optionally with simultaneous application of reduced pressure (German Offenlegungsschrift Nos. 2,461,900; 2,461,901; 2,461,902, 2,508,077 and 2,509,901). In other known processes, a pure vacuum treatment is carried out in known manner either in screw extruders or in thin-layer evaporators. By carrying out these processes on a commercial scale one difficulty usually arises namely that by evaporating the unreacted $\epsilon$-caprolactam oligomeric reaction products, mostly dimers are also liberated.

It is particularly the cyclic dimer of $\epsilon$-caprolactam which has properties unfavourable to the continuous evaporation process. Thus, it readily sublimes, its melting point at 341° C. is very high and its solubility in $\epsilon$-caprolactam is minimal (0.6% at 80° C.; 1.1% at 100° C.). Accordingly, deposits of, in the main, cyclic dimers are readily formed in the condenser systems of the evaporation apparatus, so that blockages causing interruptions in the evaporation process may occur.

Numerous proposals have been made for overcoming these difficulties. For example, it has been proposed to use condensers provided with scrapers, to work with double condensers which are used alternately or to use flushing systems. Equipment of this type involves additional outlay on apparatus and does not provide for the operational reliability required for continuous working.

German Offenlegungsschrift No. 2,503,308 describes a process for the production of low-monomer polyamide melts using an evacuation apparatus in which the difficulties described above are avoided by the evaporation of melts having relative high monomer content under pressures above 6 Torr (= 8 mbars). This ensures that the small quantities of dimers which are evaporated off with the large quantities of $\epsilon$-caprolactam remain dissolved in the condensate formed at temperatures above 100° C. The disadvantage of this process lies in the fairly low degree of utilisation of the vertically arranged, continuously operating polymerisation tubes (so-called "VK-tubes"), because a high monomer content has to be adjusted and an extra energy for distilling large quantities of monomer is required.

A continuous process for the production of low monomer and low-dimer polyamide-6 and corresponding copolyamides, by the hydrolytic polymerisation of $\epsilon$-caprolactam and, optionally, other monomers in a reactor, followed by evaporation of the low molecular weight reaction products and the unreacted $\epsilon$-caprolactam from the polycaprolactam melt, using reduced pressure and elevated temperatures, has now been found in which the evaporated products are condensed in such a way that the disadvantages referred to above are avoided. According to this inventive process the fractions separated off in the gas phase by applying a vacuum are directly condensed on the $\epsilon$-caprolactam melt to be polymerised, and the resulting mixture is delivered to the reactor, optionally together with further monomers, wherein the mixture is polymerised.

The present invention therefore relates to a preferably continuous process for the production of polyamide-6 or copolyamides consisting of at least 60% by weight of $\epsilon$-caprolactam units by hydrolytic polymerisation wherein from the polyamide melt produced by hydrolytic polymerisation the unreacted $\epsilon$-caprolactam and low molecular weight reaction products are separated off under reduced pressure and elevated temperatures and directly condensed on the $\epsilon$-caprolactam melt prepared to be polymerised and the resulting mixture is delivered to a reactor, optionally together with further monomers, where the mixture is polymerised.

By virtue of the process according to the present invention, it is possible to obtain (co-) polyamide-6 melts having low extract contents. The polymerisation in a VK-tube is followed by evaporation of the low molecular weight reaction products under low pressures without that the process is interrupted by blockages caused by deposits of dimers in the condenser system. The dimer content of the mixture present in the condenser system does not reach its solubility limit and therefore cannot separate out in the process according to the present invention.

Accordingly, the advantage of the process according to the present invention lies, on the one hand, in the fact that the production of low-monomer (co-) polyamide-6 melts in the reactor provides for maximum utilisation of the available capacity. On the other hand, the condensation of the products off in the gas phase on the $\epsilon$-caprolactam melt which is used for producing the polyamide provides a simple solution to the problem of recovering the unreacted $\epsilon$-caprolactam without involving any additional outlay on apparatus and without any danger of interruptions in the continuous cycle by precipitating dimer.

It is possible by the process according to the present invention to produce polyamides of $\epsilon$-caprolactam or copolyamides of ε-caprolactam with further aminocarboxylic acids and/or corresponding lactams such as 11-aminoundecanoic acid, oenanthic lactam, caprylic lactam or lauric lactam, and also with diamines, such as ethylene diamine, hexa- deca- or dodeca-methylene diamine, 2,2,3-and/or 2,4,4-trimethyl hexamethylene diamine, p- or m-xylylene diamine, bis-(4-aminocyclohexyl)-methane, 3-aminomethyl-3,5,5-trimethylcyclohexylamine or 1,4-diaminomethyl cyclohexylamine, and a substantially equivalent quantity of dicarboxylic acids, such as oxalic acid, adipic acid, azelaic acid, sebacic acid heptadecane dicarboxylic acid, 2,2,4-and/or 2,4,4-trimethyl adipic acid, isophthalic acid or terephthalic acid.

For the hydrolytic polymerisation from 0,1 to 8% by weight, preferably from 0,5 to 3% are added to the monomer. Instead of the water it is also possible to add compound which split off water, such as aminocarboxylic acids or salts of diamines and dicarboxylic acids such as ε-aminocaproic acid or AH-salt in amounts of from 0,5 to 10% by weight, preferably 1 to 5%.

At least 60%, by weight, preferably up to 80%, by weight, of the copolyamides should consist of ε-caprolactam units.

The process according to the present invention is particularly suitable for the production of low-extract content polyamides of ε-caprolactam.

Each technically known evaporation units for highly viscous liquids may be used for carrying out the process according to the present invention. In one preferred embodiment, thin-layer evaporators or screw evaporators are used.

Each apparatus which enabled vapours to be condensed on surfaces of liquids may be used as the condensers. Spray condensers or trickle-film condensers are preferably used for the process according to the present invention.

According to the present invention, the quantity of ε-caprolactam melt required for polymerisation is completely or partly used for condensing the vapours. In one particularly advantageous embodiment, the ε-caprolactam melt present in the condenser system is recirculated by pumping before being delivered to the reactor, where it is polymerised.

The temperature of the polyamide melt in the evaporator is variable over a wide range and is dependent upon the residence time. However, it has been found that temperatures of from 240° to 320° C. are favourable, temperatures of from 250° to 290° C. being preferred.

In the process according to the present invention, the temperature of the ε-caprolactam melt, on which the products separated off in the gas phase are condensed, is from 75° to 120° C., preferably from 75° to 100° C.

The vacuum in the evaporator is adjusted to from 0.3 to 5 Torr (from 0.4 to 6.5 mbars), preferably from 0.3 to 2 Torr (0,4 to 2,5 mbar) the polymerisation temperature in the reactor, preferably in the VK tube, ranges from 240° to 280° C. At its lower end, the pressure range is limited by the melting point of the ε-caprolactam. At pressures above 5 Torr (6.5 mbars), the products obtained are of limited commercial value because of a reduction in the degree of evaporation.

The low-monomer and low-dimer polyamides obtained by the process according to the present invention may be directly spun and processed into granulate in known manner after leaving the reactor. They are no different in the properties thereof from polyamides obtained by conventional processes. Accordingly, they may be mixed with known additives, fillers and reinforcing materials in known amounts and used for all the conventional applications, for example for the production of shaped articles by injection moulding or extrusion.

EXAMPLE 1

25 kg/h of a polycaprolactam melt produced by hydrolytic polymerisation in a VK-tube and having a monomer content of 7.5% and a dimer content of 0.53% are passed through a thin-layer evaporator. The polyamide has a relative viscosity of 2.78 on a 1% solution in m-cresol at 25° C. The temperature prevailing in the thin-layer evaporator is 270° C. and the vacuum 1 Torr (1.3 mbar).

The vapours are condensed on the quantity of ε-caprolactam melt required for the production of polyamide-6. The ε-caprolactam melt is passed through a trickle-film condenser and then directly delivered to the VK-tube. In the trickle-film condenser, the ε-caprolactam melt is pump-recirculated at a rate of 2400 liters per hour and has a temperature of 85° C. The evaporated polycaprolactam melt contains 0.19% of monomer and 0.11% of dimer. It has a relative viscosity of 3.27. No deposition of dimers is observed. The polycaprolactam melt is processed into granulate in known manner.

EXAMPLE 2

30 kg/h of a polycaprolactam melt produced by hydrolytic polymerisation in a VK-tube and having a monomer content of 6.8% and a dimer content of 0.49% is passed through a twin-screw extruder for degassing. The polyamide has a relative viscosity of 2.55. The temperature prevailing in the extruder is 290° C. and the vacuum 1.1 Torr (1.5 mbar). The vapours are condensed on the quantity of ε-caprolactam melt required for the production of polyamide-6. The ε-caprolactam melt is passed through a spray condenser and then directly delivered to the VK-tube. In the spray condenser, the ε-caprolactam melt having a temperature of 87° C. is pump-recirculated at a rate of 1500 liters per hour. The evaporated polycaprolactam melt contains 0.29% of monomer and 0.17% of dimer. The polyamide-6 has a relative viscosity of 2.98. No deposition of dimers is observed. The polycaprolactam melt is processed into granulate in known manner.

What is claimed is:

1. A continuous process for producing a polymer of ε-caprolactam having low monomer and low dimer content wherein at least 60% of the polymer consists of units from caprolactam which comprises polymerizing the monomers hydrolytically, subjecting the polymer melt thus obtained to vacuum to remove unreacted caprolactam monomer and caprolactam dimer as a gaseous phase contained therein, condensing directly the removed monomer and dimer from the gaseous phase on the melt of caprolactam to form a molten caprolactam composition which is directly subjected to said hydrolytic polymerization.

2. A process, as claimed in claim 1, wherein the ε-caprolactam melt on which the reaction products and the ε-caprolactam separated off in the gas phase are condensed, is maintained at a temperature of from 75° to 120° C.

3. A process, as claimed in claim 1, wherein a vacuum of from 0.3 to 5 Torr is adjusted in the evaporator.

4. A process, as claimed in claim 1, wherein the polyamide melt to be evaporated is heated to temperatures of from 240° to 320° C. in the evaporator.

5. A process, as claimed in claim 1, wherein the reaction products and the ε-caprolactam separated off in the gas phase are condensed on the total quantity of ε-caprolactam melt to be polymerised.

6. A process, as claimed in claim 1, wherein the evaporator used in a thinlayer evaporator or a screw evaporator.

7. A process, as claimed in claim 1, wherein the condenser used is a spray condenser or a trickle film condenser.

* * * * *